(12) United States Patent
Li (10) Patent No.: US 11,693,642 B2
(45) Date of Patent: Jul. 4, 2023

(54) METHOD AND SYSTEM FOR CROSS-PLATFORM DEPLOYMENT

(71) Applicant: HUAWEI TECHNOLOGIES CO., LTD., Shenzhen (CN)

(72) Inventor: Shitao Li, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 550 days.

(21) Appl. No.: 16/814,409

(22) Filed: Mar. 10, 2020

(65) Prior Publication Data

US 2020/0264858 A1 Aug. 20, 2020

Related U.S. Application Data

(63) Continuation of application No. PCT/CN2018/099356, filed on Aug. 8, 2018.

(30) Foreign Application Priority Data

Sep. 22, 2017 (CN) .......................... 201710864390.0

(51) Int. Cl.
*G06F 9/455* (2018.01)
*G06F 8/60* (2018.01)
(Continued)

(52) U.S. Cl.
CPC ............ *G06F 8/60* (2013.01); *G06F 9/44505* (2013.01); *G06F 9/45533* (2013.01); *G06F 40/186* (2020.01); *H04L 67/34* (2013.01)

(58) Field of Classification Search
CPC ....................................................... G06F 8/60
(Continued)

(56) References Cited

U.S. PATENT DOCUMENTS 9,134,964 B2 *  9/2015  Hirsch .................... G06F 8/30
9,626,172 B2 *  4/2017  Hu ......................... H04L 41/0895
(Continued)

FOREIGN PATENT DOCUMENTS

CN  103092670 A  5/2013
CN  103970908 A  8/2014
(Continued)

OTHER PUBLICATIONS

XP014311783 ETSI GS NFV-MAN 001 V1.1 1 (Dec. 2014),Network Functions Virtualisation (NFV);Management and Orchestration,Group Speci Fication, European Telecommunications Standards Institute (ETSI), total 184 pages.
(Continued)

*Primary Examiner* — Evral E Bodden
(74) *Attorney, Agent, or Firm* — Huawei Technologies Co., Ltd.

(57) ABSTRACT

A method and system which provides a solution of cross-platform application deployment, which is based on a Topology and Orchestration Specific for Cloud Applications (TOSCA) template and is compatible with application deployment on other platforms. This solution supports cross-platform application deployment on both a TOSCA platform and a non-TOSCA platform. By adding information about a target platform and application deployment information required for application deployment on the target platform to a deployment template, an upper server performs parsing and sends the application deployment information to the target platform, thereby implementing cross-platform application deployment on the TOSCA platform and the non-TOSCA platform by using one universal template.

20 Claims, 6 Drawing Sheets

(51) Int. Cl.
*G06F 40/186* (2020.01)
*G06F 9/445* (2018.01)
*H04L 67/00* (2022.01)

(58) Field of Classification Search
USPC .......................................................... 718/1
See application file for complete search history.

(56) References Cited

U.S. PATENT DOCUMENTS

| | | | |
|---|---|---|---|
| 9,935,825 B2 * | 4/2018 | Aswathanarayana | ... H04L 67/34 |
| 2015/0242199 A1 | 8/2015 | Goldstein et al. | |
| 2016/0110183 A1 | 4/2016 | Fu et al. | |
| 2016/0259658 A1 * | 9/2016 | Gocek | ................. G06F 9/45558 |
| 2018/0046482 A1 * | 2/2018 | Karve | ................. G06F 9/45558 |

| | | | |
|---|---|---|---|
| 2019/0268262 A1 | 8/2019 | Wang | |

FOREIGN PATENT DOCUMENTS

| | | | | |
|---|---|---|---|---|
| CN | 105159760 A | | 12/2015 | |
| CN | 105260225 A | | 1/2016 | |
| CN | 106796508 A | | 5/2017 | |
| CN | 106936715 A | | 7/2017 | |
| CN | 107836007 A | * | 3/2018 | ........... G06F 9/5072 |

OTHER PUBLICATIONS

XP014227667 Deepanshu Gautam et al.,"NFV-MANO management and orchestration mechanism",dated Apr. 10, 2013,total 12 pages.

* cited by examiner

METHOD AND SYSTEM FOR CROSS-PLATFORM DEPLOYMENT

CROSS-REFERENCE TO RELATED APPLICATIONS

This application is a continuation of International Application No. PCT/CN2018/099356, filed on Aug. 8, 2018, which claims priority to Chinese Patent Application No. 201710864390.0, filed on Sep. 22, 2017. The disclosures of the aforementioned applications are hereby incorporated by reference in their entireties.

TECHNICAL FIELD

This application relates to virtualization technologies, and in particular, to a method and system for cross-platform application deployment on a virtualized resource platform.

BACKGROUND

Physical Information Technology (IT) resources may be converted into virtual IT resources through virtualization to implement flexible configuration of resources. Benefiting from virtualization technologies, hardware and software functions may be decoupled from each other, so that functions of special-purpose hardware in a conventional network may be run on general-purpose hardware equipment, thereby reducing costs of deploying special-purpose hardware. In a virtualized network, a party which initiates a virtualization request is referred to as a service requester, and a party which provides a virtualization service deployment capability is referred to as a virtualization service provider. During virtualized deployment of a network service, a service requester generally needs to submit a description of the service to a service provider first. The description is referred to as a deployment template of the service. Information such as resource requirements about nodes that constitute the service and connection relationships between the nodes are described in the deployment template.

Figure 1:
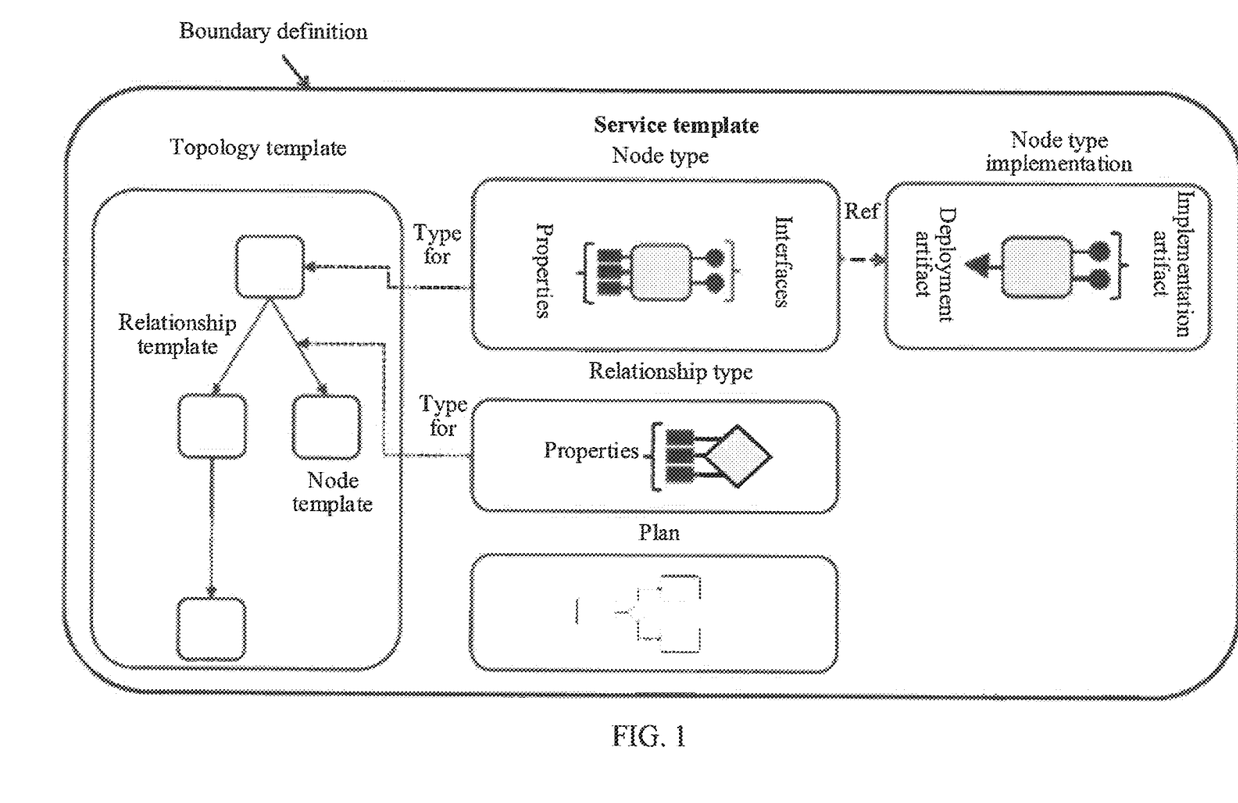
FIG. 1 is a schematic diagram of a deployment template defined by the TOSCA.

TOSCA (Topology and Orchestration Specific for Cloud Applications), defined by the OASIS TOSCA Organization, is a common description language for a deployment template. As shown in FIG. 1, a deployment template defined by using the TOSCA includes an application deployment description file (service template) that includes information about all nodes (node template) and relationships between the nodes (relationship template) in an entire service.

A TOSCA service template uses a topology template to describe a topology of an application. Each node in the topology corresponds to a node template, and a type of the node template is defined by a node type (an attribute type of the node template describes a node type corresponding to the node template). The node template may represent a VNF (virtualized network function) description, that is, a VNFD (VNF description). Each link in the topology corresponds to a relationship template. The relationship template is an instance of a relationship type, and defines a start point (defined as a source element) and an endpoint (defined as a target element) of the link. In NFV (Network Functions Virtualization, network functions virtualization), the relationship template may define a connection relationship between two VNFs. The relationship type stipulates the connection relationship between two nodes according to a definition. For example, when a relationship type defined as "depends on" is used between a node A and a node B, the node A is a source element, and the node B is the target element, the node B needs to be deployed before the node A can be deployed.

Currently, a specification for a template description using the YAML language (YAML Ain't Markup Language) is defined in the TOSCA. A Service Template (template description) of a WordPress service (a website service) deployment described in the YAML language using the TOSCA specification is as follows:

```
tosca_definitions___version: tosca_simple_yaml_1_0_0
description: template for deploying a two-tier application servers on two
topology_template
inputs:
    # Admin user name and password to use with the WordPress
    application
    wp_admin_username:
        type: string
    wp_admin_password:
        type string
    wp_db_name:
        type: string
    wp_db_user:
        type: string
    wp_db_password:
        type: string
    wp_db_port:
        type: integer
    mysql_root_password:
        type string
    mysql_port:
        type integer
node_templates:
    wordpress:
        type: tosca.nodes.WebApplication.WordPress
        properties:
            admin_user: { get_input: wp_admin___username }
            admin_password: { get_input: wp_admin_password }
            db_host: { get_property: [ db_server, db_name ] }
        requirements:
            - host: apache
            - database_endpoint: wordpress_db
        interfaces:
            Standard:
                inputs:
                    db_host: { get_property: [ db_server,
                        db_name ] }
                    db_port: { get_property: [ wordpress_db,
                        db_port ] }
                    db_name: { get_property: [ wordpress_db,
                        db_name ] }
                    db_user: { get_property: [ wordpress_db,
                        db_user ] }
                    db_password: { get_property: [ wordpress_db,
                        db_password ] }
    apache:
        type: tosca.nodes.Webserver.Apache
        properties:
            # omitted here for sake of brevity
        requirements:
            - host: web_server
    web_server:
        type: tosca.nodes.Compute
        properties:
            # omitted here for sake of brevity
    wordpress_db:
        type: tosca.nodes.Database.MySQL
        properties:
            db_name: { get_input: wp_db_name }
            db_user: { get_input: wp_db_user }
            db_password: { get_input: wp_db_password }
            db_port: { get_input: wp_db_port }
        requirements:
            - host; mysql
```

-continued

```
    mysql:
        type: tosca.nodes.DBMS.MySQL
        properties:
            dbms_root_password: { get_input: mysql_rootpw }
            dbms_port: { get_input: mysql_port }
        requirements:
            - host: db_server
    db_server:
        type: tosca.nodes.Compute
        properties:
            db_name: sql_database1
outputs:
    server_ip:
        description: The IP address of the provisioned server.
            value: { get_attribute: [ wordpress, ip_address ] }
```

Parameters defined by the element "inputs" indicate that values of the parameters need to be confirmed and entered during deployment. Such parameters, for example, an IP address, and a username that is created for a user during deployment, may be different for different deployment requirements.

Nodes included in the service are described by the element "node_templates". For example, Service Template includes such nodes as "wordpress", "apache", "web_server", "webpress db", "mysql", and "db_server".

"wordpress" is used as an example, where "type: tosca.nodes.WebApplication.WordPress" indicates that a node type of the node is "tosca.nodes.WebApplication.WordPress", and the type needs to be defined before the Service Template is deployed. The parameters such as "admin_user", "admin_password", and "db_host", of the node are defined in "properties". A value assigned to "admin_user" is "get_input: wp_admin_username". "get_input" is an operation defined in a YAML version, and indicates that a value of "get_input" needs to be entered during deployment. In this example, a parameter corresponding to "get_input" is "wp_admin_username", indicating that an input value of "wp_admin_username" needs to be obtained during deployment and assigned to "admin_user". A value assigned to "db_host" is "get_property: [db_server, db_name]". "get_property" is another operation defined in the YAML version. This operation is used to get values from "properties" defined in other nodes. In this example, the value, namely, "sql_database1", is obtained from "db_name" defined in "db_server" of the node, and is assigned to "db_host". The node further defines "requirements", which is used to indicate connection relationships between the node and other nodes. For example, "requirements" herein has the following two parameters: "host: apache" and "database endpoint: wordpress_db", which respectively indicate that the relationship between the node and "apache" is "hosted on" and the relationship between the node and "wordpress_db" is "connects to".

Figure 2:
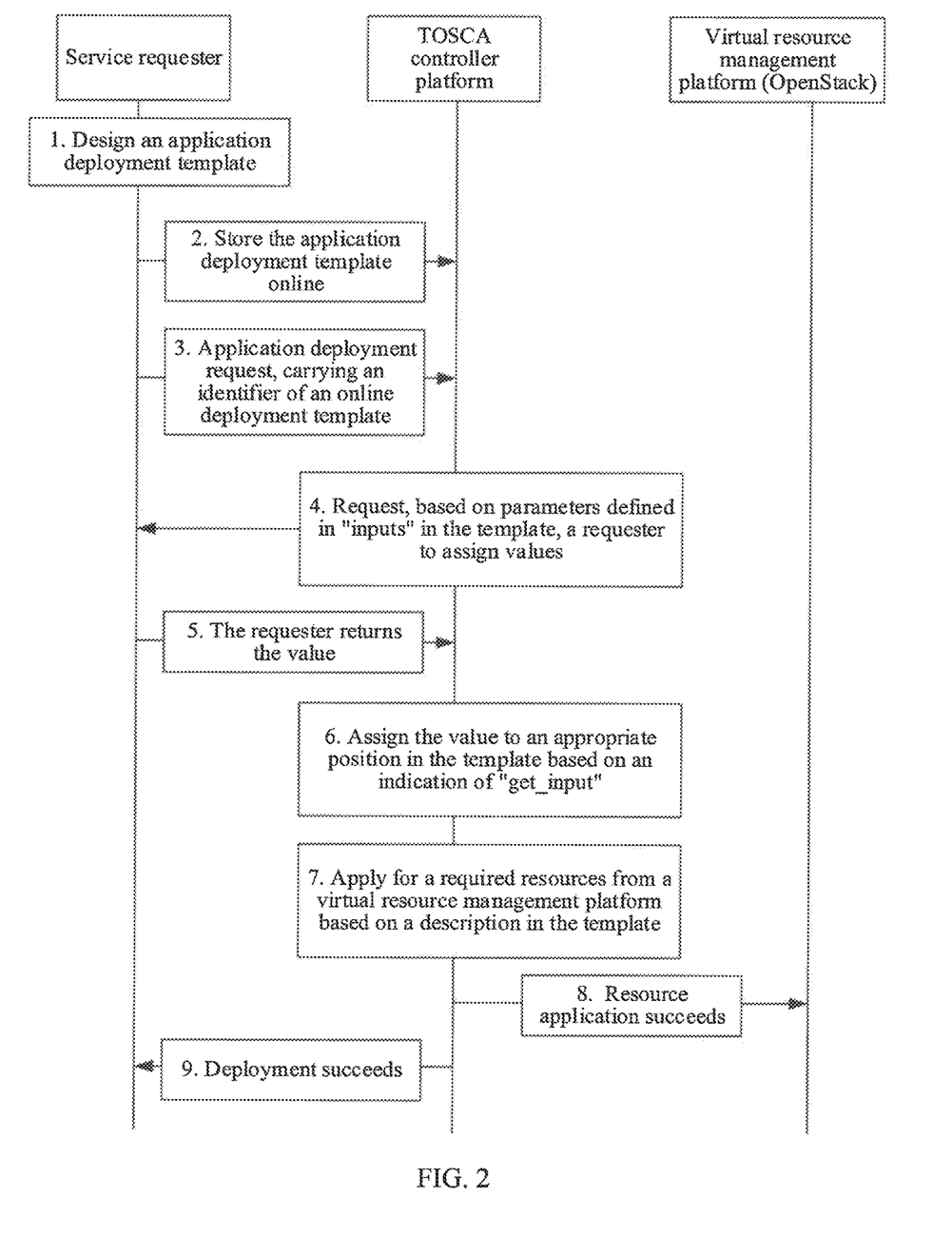
FIG. 2 is a flowchart of processing of application deployment that supports a TOSCA template.

FIG. 2 shows a processing procedure of application deployment that supports a TOSCA template:

1. A service requester designs an application deployment template. In this example, a deployment template is designed by using the TOSCA language. For example, the application deployment template is the foregoing example of the TOSCA template.

2. The service requester sends the deployment template to a TOSCA control platform to be stored online.

3. The service requester sends a deployment request carrying an identifier of an online deployment template. In this example, the online deployment template is the deployment template stored online in Step 2. In a possible case, the deployment request further carries values assigned to the parameters in "inputs" in the template.

```
    wp_admin_username:
        type: string
    wp_admin_password:
        type string
    wp_db_name:
        type: string
    wp_db_user:
        type: string
    wp_db_password:
        type: string
    wp_db_port:
        type: integer
    mysql_root_password:
        type string
    mysql_port:
        type integer
```

In another possible case, the deployment request does not include the values assigned to the parameters in "inputs". In this case, a controller requests, based on the parameters defined in "inputs" in the template, the requester to assign the values in Step 4, and receives the assigned values of the parameters in "inputs" returned by the requester in Step 5.

6. After being obtained, the values need to be assigned to appropriate positions in the template based on an indication from "get_input". For example, values need to be obtained from "inputs" for parameters in "wordpress_db":

```
    wordpress_db:
        type: tosca.nodes.Database.MySQL
        properties:
            db_name: { get_input: wp_db_name }
            db_user: { get_input: wp_db_user }
            db_password: { get_input: wp_db_password }
            db_port: { get_input: wp_db_port }
```

7. Required resources are applied for from a virtual resource management platform based on a description in the template.

8. Resource application succeeds.

9. Application deployment succeeds.

Currently, the OVF (open virtualization format) language defined by the DMTF (Distributed Management Task Force) is also used for describing a deployment template. The language is mainly used on a VMware platform, and service deployment using the OVF language mainly includes two parts: the first part is a service design stage, that is, generation of a deployment package. The second part is a deployment stage. The two parts are separately described below.

First Part: Service Design Stage:

1. A user first needs to start a required virtual machine locally, installs required software on the virtual machine, shuts down the virtual machine after installation is completed, and exports an image of the virtual machine.

2. Next, create, by using a tool that supports OVF, a deployment template described in an OVF format. The deployment template includes information such as connection relationships between the virtual machines.

3. Finally, generate a deployment package of the application on the tool. The deployment package includes the image exported in Step 1 and the deployment template generated in Step 2, and further includes other files such as authentication files.

Figure 3:
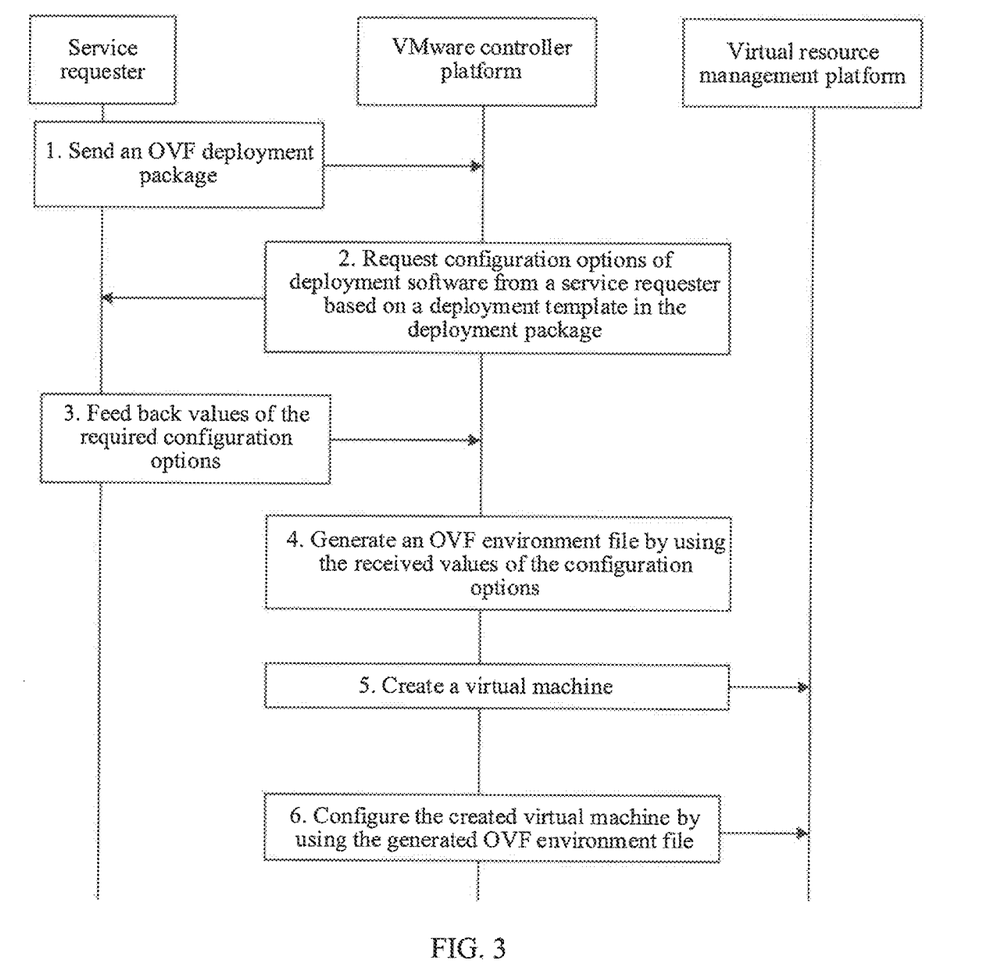
FIG. 3 is a flowchart of processing of application deployment that supports the OVF language.

Second Part: Deployment Stage:

Main steps are shown in FIG. 3, and are as follows:

1. The service requester sends an OVF deployment package completed in the service design stage to a VMware controller platform.

2. The VMware platform parses the OVF deployment package to obtain configuration options required for application deployment, and requests values of the required configuration options from the service requester.

3. The service requester feeds back the values of the required configuration options.

4. The VMware controller platform generates an OVF environment file by using the received values of the configuration options.

5. Create a virtual machine by using the OVF deployment package.

6. Configure the created virtual machine by using the generated OVF environment file to complete application deployment.

TOSCA is a widely used application deployment template, and is mainly applied to OpenStack platform (also referred to as a TOSCA platform herein). However, a service modeled using a TOSCA template cannot be deployed on a VMware platform, and a service modeled using an OVF template cannot be deployed on a TOSCA platform either. Therefore, a template in the prior art is applicable to a single deployment platform, and cross-platform application deployment cannot be implemented.

SUMMARY

In view of this, aspects of the present invention provide a method and system that can adapt to cross-platform application deployment.

Embodiments of the present invention provide a method for cross-platform application deployment and a method for generating an application deployment template, which are based on a TOSCA template and are compatible with requirement of application deployment on other platforms. This solution supports cross-platform application deployment on both a TOSCA platform and a non-TOSCA platform.

Specifically, first, a target platform for application deployment is determined on a side of a client. The target platform includes a platform of a type other than a TOSCA platform, for example, an OVF platform. Second, application deployment information required for application deployment on the target platform is generated. For example, an OVF deployment package is correspondingly generated for the OVF platform. Information about the target platform for deployment and the application deployment information required for application deployment on the target platform for deployment are added to a universal deployment template that conforms to a TOSCA template format, and the deployment template is stored online on an upper server. An application deployment request is sent to the upper server when application deployment is required.

On a side of the upper server, after receiving the application deployment request sent by the client, the upper server may determine a deployment template required for application deployment based on the deployment request, for example, by using identification information, for example, a deployment template identifier, carried in the deployment request. The identification information may be stored on the server in the foregoing process of storing the deployment template online. After obtaining the deployment template, the upper server may send the application deployment information to the target platform based on the information about the target platform in the deployment template.

After receiving the application deployment information, the target platform may determine configuration parameters required to complete application deployment, and send a request used to obtain the configuration parameters required for application deployment to the upper server. After receiving the request, the upper server may obtain values of the configuration parameters required for application deployment from previous configuration information or the side of the client that requests deployment, and send the obtained values of the configuration parameters to the target platform. In this way, the target platform may deploy an application based on the application deployment information and the values of the configuration parameters required for application deployment.

The foregoing process implements a deployment template that conforms to the TOSCA template format, to deploy an application on a non-TOSCA platform. Moreover, the application may be deployed on a TOSCA platform by using the deployment template and an existing general procedure of deployment on the TOSCA platform. In this way, cross-platform application deployment is implemented by using a universal deployment template.

An embodiment of the present invention further provides a specific implementation in which a target platform is an OVF platform. Information about the target platform may be added to parameters in "inputs" of a TOSCA template. Application deployment information is an OVF deployment package or an address of the OVF deployment package, and may be added to deployment artifacts of deployment nodes in the TOSCA template. The application deployment information may be placed in the deployment artifacts in a form of a file address, and the file address is an address for storing the OVF deployment package. Further, a transfer indication may further be added to an application deployment template, and the transfer indication is used to indicate sending of the application deployment information to the target platform. For implementations on other types of platforms, refer to the implementation solution provided in the embodiment of the present invention.

Correspondingly, an embodiment of the present invention provides a system for cross-platform application deployment, including an upper server and a target platform that are configured to implement the foregoing functions.

An embodiment of the present invention further provides a client and a server that can support cross-platform application deployment, to implement the foregoing functions.

Cross-platform application deployment can be effectively implemented by using the solution provided in the embodiments of the present invention. A universal deployment template and an upper server are used to support a plurality of resource platforms, thereby implementing flexible cross-platform deployment.

DESCRIPTION OF EMBODIMENTS

The following describes the technical solutions in the embodiments of the present invention with reference to the accompanying drawings in the embodiments of the present invention.

Figure 4:
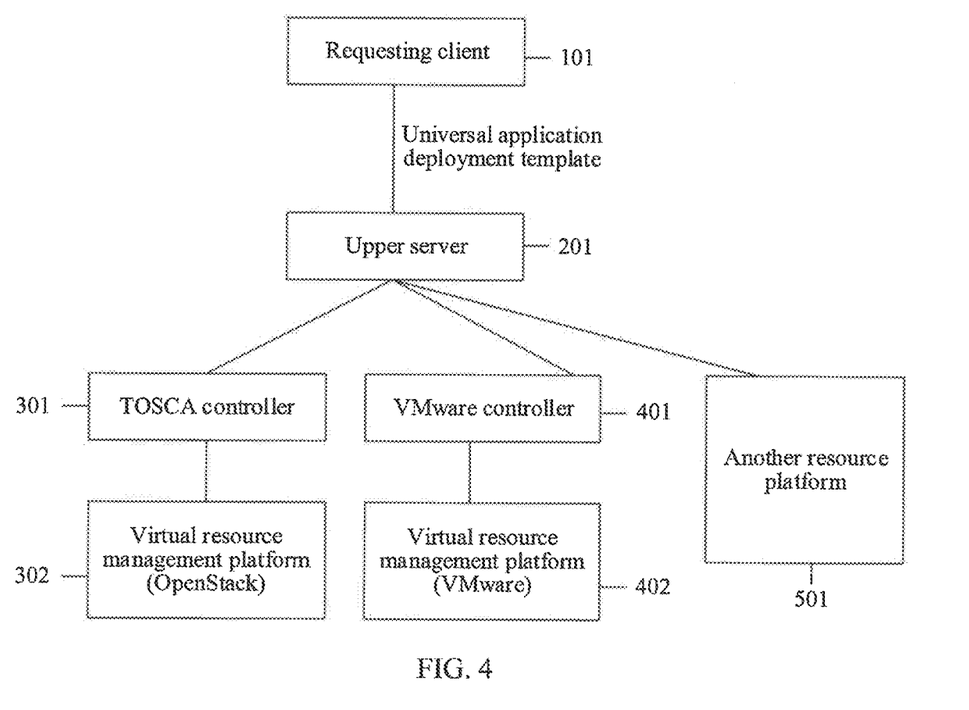
FIG. 4 is an architectural diagram of a system for cross-platform application deployment according to an embodiment of the present invention.

To resolve the problem in the prior art, the embodiments of the present invention provide a universal deployment template compatible with application deployment on a TOSCA platform and other platforms, to implement cross-platform application deployment by using one deployment template. For a new deployment template, the embodiments of the present invention further provide an upper server that can identify and parse the new deployment template, determine a target platform for deployment of an application based on content in the deployment template, and send application deployment information to a corresponding resource platform.

form (OpenStack) 302 corresponding to the TOSCA controller 301, a VMware controller 401, and a virtual resource management platform (VMware) 402 corresponding to the VMware controller 401 are shown in FIG. 4. A universal cross-platform application deployment template is used for the requesting client 101 and the upper server 201. The upper server 201 determines, based on information in the application deployment template, to send application deployment information to a corresponding target platform, to implement resource deployment. The target platform interacts with the upper server to obtain values of necessary configuration parameters required for application deployment. It should be noted that the upper server is named relative to controllers on other platforms, indicating that the upper server is located at an upper universal control position. "Upper" is used merely for ease of understanding and writing, and does not constitute other specific limitations on the position or functions of the server.

Details of the implementation are further described below. An example of an application deployment template that is based on the TOSCA language and is compatible with OVF deployment provided in this embodiment of the present invention is as follows:

```
topology_template:
    inputs:
        parameter A:
        app1_input:
            type: external
            source: OVF
                    transfer: get_artifact(app1)
    node_templates:
        app1:
            type: tosca.nodes.OVF1
            properties:
                # Omitted here for brevity
            artifacts:
                appimage:
                    file : local/vdu1.OVA          # Address information
                    type: OVF                      # Indicate that a type of the artifact is an OVF type
                    implementation:                # Indicate operations to be executed by the artifact during deployment
                            environment: get_output(app1_input)    #Environment file for deployment
                                                                   #From an output of OVF
            requirements:
                host1
                    node_filter:
                        capabilities:              #Indicate that resource information of the virtual machine is from OVF
description information
                        source: OVF
        app2:
            type: tosca.nodes.VNF2
            properties:
                # Omitted here for brevity
            artifacts:
                appimage:
                    file : local/vnf2.iso          # Path Address information
                    type: iso
```

In the following descriptions of the embodiments, a cross-platform template design and application deployment that are compatible with a TOSCA platform and an OVF platform are used as examples. Template designs of other platforms can be implemented by following the principles provided in the embodiments of the present invention.

FIG. 4 shows a system architecture of cross-platform application deployment, including a requesting client 101, an upper server 201, and two or more resource platforms. Each resource platform may include a corresponding controller and a virtual resource management platform. A TOSCA controller 301, a virtual resource management plat- The example of the template is based on a TOSCA template, and is appropriately reformed to be compatible with application deployment in an OVF format. "topology_template" represents a template of the entire topology of an application, and includes the following content, that is, "inputs" and "node_templates". "inputs" is used to describe input parameters required for deploying the application, and "node_templates" is used to describe all the nodes included in the application.

In this example, a parameter "app1_input" is defined in "inputs", and includes the following content:

type: external source: OVF
transfer: get_artifact(app1)

"type: external" is used to indicate that an input type of the parameter "app1_input" is an external input, that is, an input from an external platform.

"source: OVF" is used to indicate that a specific external platform is an OVF platform. It can be understood that a target platform can be recognized as an external platform by using information of "source". A configuration item of type "type" is optional.

"transfer: get_artifact(app1)" is used to indicate that a file that needs to be transferred to the OVF platform is "get_artifact(app1)", that is, an artifact (artifact) included in app1 corresponds to an artifact defined in an app1 node in "node_templates". A file address is "local/vdu1.OVA", indicating that the application deployment information is sent to the target platform, and an OVF deployment package is stored at the file address. For a generation process of the OVF deployment package, reference can be made to descriptions in BACKGROUND. It should be noted that the server may also send a file at a designated position (such as an artifact file included in app1) to the target platform by using a default configuration, and does not need to follow a transfer indication. Therefore, the indication is optional information. In addition, a storage position of the transfer indication is not limited to "inputs". For example, the transfer indication may be alternatively stored at to-be-transferred deployment artifacts "artifacts", or at another appropriate position. A name and a representation manner of the indication are not limited provided that transfer is indicated.

All the nodes included in the application are defined in "node_templates". This embodiment simply lists two nodes, namely, an app1 and an app2, where artifacts of the node app1 are artifact information required for deployment, and is, for example, an OVF deployment package in this example. In this embodiment, a type of an image is OVF. The OVF deployment package is added to the TOSCA template as an artifact. Specifically, in a form of a file address, address information of the OVF deployment package is stored at a file address corresponding to a field "file". Certainly, if the size of data that can be carried is large enough, an OVF deployment package can be carried directly.

"implementation" defines execution steps required to deploy the artifact. In this example, the execution step is "get_output(app1_input)", indicating that an output "output" is obtained from "app1_input" and corresponds to values obtained from outside by "app1_input" in "inputs".

app2 is a node that is defined by a standard TOSCA template. The node can be directly deployed by using a TOSCA (OpenStack) platform.

By using the foregoing template, an original TOSCA template is extended to be compatible with application deployment on other platforms. In this way, an application can be deployed on both a TOSCA platform and an OVF platform, and cross-platform deployment is implemented.

To support a universal deployment template, a requesting client needs to have a capability of creating a template. In specific implementation, the requesting client first needs to determine a target platform for application deployment, generates application deployment information required for application deployment on the target platform, and creates a deployment template that conforms to a TOSCA template format, and the deployment template includes information about the target platform for deployment and the application deployment information required for application deployment on the target platform for deployment. The OVF platform is used as an example. The deployment template has described the information about the target platform and how to add the application deployment information to the deployment template.

The implementation of cross-platform deployment is described below in detail from the perspective of an implementation procedure with reference to the accompanying drawings.

Figure 5:
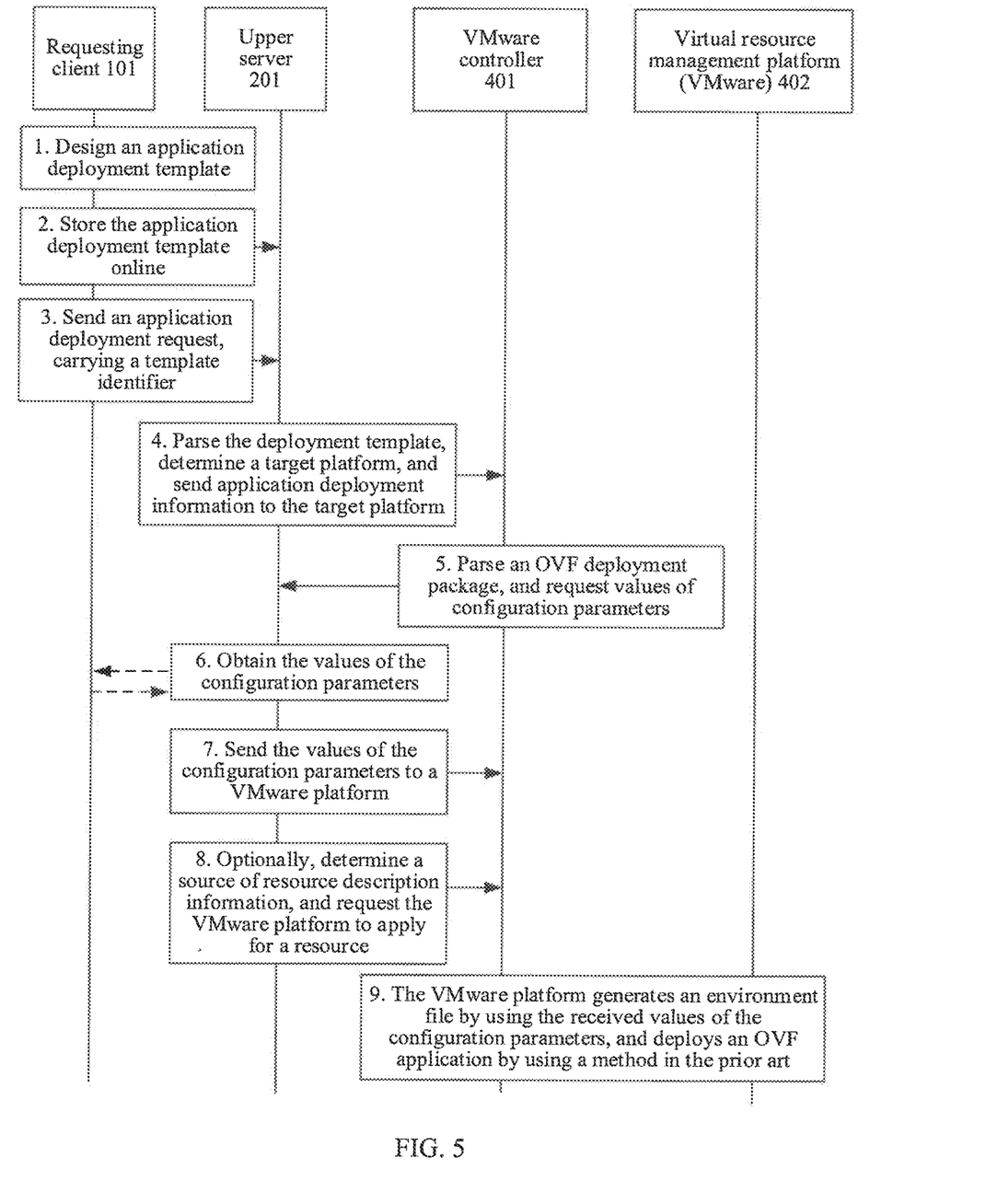
FIG. 5 is a flowchart of cross-platform application deployment according to an embodiment of the present invention.

As shown in FIG. 5, a specific procedure of application deployment is as follows:

1. A requesting client designs an application deployment template based on the foregoing description and creates the application deployment template.

2. Send the designed application deployment template to an upper server to be stored online. Other files required for deployment may also be sent to the upper server. The "online" means that the application deployment template is stored on the upper server for subsequent direct use of the application deployment template. An identifier may be assigned to identify the application deployment template to facilitate a fast search for the corresponding application deployment template by using the identifier during subsequent template deployment.

3. Send an application deployment request. An identifier of an online application deployment template may be carried in the deployment request, so that the upper server obtains the online application deployment template based on the identifier of the application deployment template.

4. The upper server parses the application deployment template, and determines a target platform for deployment based on the parameters in "inputs" of a to-be-deployed application in the application deployment template. In this embodiment, the target platform is an OVF platform app1_input:
type: external
source: OVF
transfer get_artifact(app1)

Based on a transfer indication or a default configuration, a file in deployment artifacts (artifact) of app1 is sent to the target platform, namely, a VMware platform (or referred to as an OVF platform). That is, the corresponding artifact is a file that is located at "local/vdu1.OVA" and that is defined by app1 in "node_templates", and the artifact is an OVF deployment package.

5. The VMware platform parses, based on the received OVF deployment package, the OVF deployment package by using the prior art, determines configuration parameters required for application deployment, and sends a request used to obtain values of the configuration parameters to the upper server used.

6. After receiving the request used to obtain the values of the configuration parameters, the upper server obtains the values of the corresponding configuration parameters. The requesting client may send the values of the configuration parameters required for application deployment in advance (for example, in Step 3) to the upper server for storage, so that the upper server sends the values of the configuration parameters to the VMware platform based on the values of the configuration parameters that have been stored locally. If the values of the configuration parameters are not stored locally, the upper server may send the request to the requesting client to obtain the values of the configuration parameters required for application deployment from a side of the requesting client. In this process, other parameters defined in "inputs" in the deployment template may be returned together to the requesting client to request assignment of values. Alternatively, as described in the prior art, values of the parameters defined in "inputs" may be carried when the application deployment request is sent in Step 3.

7. The upper server sends the values of the configuration parameters to the VMware platform. Specifically, according to execution steps that are defined in "implementation" in the deployment template and that are required to deploy the artifact, the upper server may obtain, from outside, the values of the configuration parameters (also referred to as environment parameters, environment variables or the like) required for deploying app1.

8. Optionally, the upper server determines whether the deployment template indicates a source of resource description information. If the source is from a corresponding external environment, the upper server requests the corresponding VMware platform to apply for the resource. That is, a description of app1 includes:
requirements:
host1
node_filter:
capabilities: # Indicate that resource information of the virtual machine is from OVF description information
source: OVF This determination is optional, because in Step 4, it can already be determined based on the values of the parameters in "inputs" that the target platform for application deployment is a non-TOSCA platform.

9. The VMware platform generates an environment file based on the received values of the configuration parameters and deploys an OVF application by using the method in the prior art.

The method of deploying app2 on the TOSCA platform belongs to the prior art, and is not described again in this embodiment.

Based on the above, the manner of implementing cross-platform application deployment is described by using a procedure. It can be learned from the foregoing process that the target platform does not need to be changed for cross-platform application deployment. The VMware platform may implement application deployment merely according to the solution of the prior art. The upper server is equivalent to a proxy of the OVF requesting terminal, and implements all functions of the original OVF requesting terminal. In this implementation solution, it is not necessary to reform existing resource platforms, and deployment and implementation of the solution are facilitated.

Figure 6:
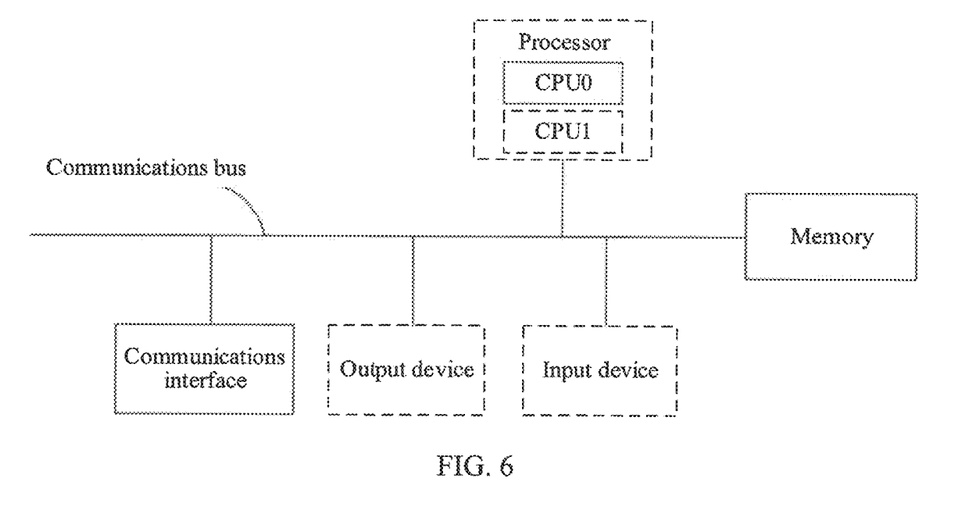
FIG. 6 is a schematic architectural diagram of a general-purpose computer.

The requesting client is any type of client that can request application deployment, for example, any type of device such as a common computer, intelligent terminal or tablet computer. It should be understood that the flowchart in the foregoing embodiment may be implemented by using computer program instructions and/or hardware operations. FIG. 6 shows a general-purpose computer structure. These computer program instructions stored in a memory may be provided to a processor of a general-purpose computer or a special-purpose computer or another programmable data processing apparatus. In this way, the instructions are executed by the processor of the computer or any other programmable data processing apparatus to implement functions of the requesting client 101 and the upper server 201 in the flowchart.

These computer program instructions may also be stored in a computer usable or computer readable memory that is run in a specific way by a bootable computer or another programmable data processing apparatus, so that the instructions stored in the computer usable or computer readable memory produce an article of manufacture. The article of manufacture includes an instruction used to implement a function specified in one or more blocks in the flowchart and/or block diagram.

The computer program instructions may also be loaded in a computer or another programmable data processing apparatus, so that a series of operations are performed by the computer or the another programmable data processing apparatus to generate a process implemented by the computer. In this way, the instructions executed on the computer or the another programmable data processing apparatus are provided to implement steps of functions specified in one or more blocks in the flowchart and/or block diagram.

In the foregoing exemplary designs described above, the functions described in the embodiments of the present invention may be implemented in hardware, software, firmware, or any combination thereof. If implemented in software, these functions may be stored in a computer readable medium or are transferred to the computer readable medium in a form of one or more instructions or code. The computer readable medium is either a computer storage medium or a communications medium that enables a computer program to move from one place to another. The storage medium may be any available medium that can be accessed by a general-purpose or special-purpose computer. For example, such a computer readable medium may include, but is not limited to, a RAM, a ROM, an EEPROM, a CD-ROM, or another optical disc storage, a disk storage or another magnetic storage apparatus, or any other medium that may be used to carry or store program code, where the program code is in a form of an instruction or a data structure or another form that can be read by a general-purpose or special-purpose computer or a general-purpose or special-purpose processor. In addition, any connection may be appropriately defined as a computer readable medium. For example, if software is transferred from a website, a server, or another remote resource by using a coaxial cable, an optical fiber cable, a twisted pair, a digital subscriber line (DSL) or in a wireless manner, such as infrared, radio, or microwave, the software is included in a defined computer readable medium. The disc and the disk include a compact disc, a laser disc, an optical disc, a DVD, a floppy disk, and a Blu-ray disc. The disks usually reproduce data magnetically, and the discs usually reproduce data optically with lasers. The foregoing combinations may also be included in the computer readable medium.

An embodiment of the present invention further provides a requesting client, including a unit for determining a target platform, a unit for generating application deployment information, and a unit for creating a deployment template. The unit for determining a target platform is configured to determine a target platform for application deployment, where the target platform is a platform of a type other than a TOSCA platform. The unit for generating application deployment information is configured to generate application deployment information required for application deployment on the target platform. The unit for creating a deployment template is configured to create a deployment template that conforms to a TOSCA template format, where information about the target platform for deployment and the application deployment information required for application deployment on the target platform for deployment are included in the deployment template. The unit for creating a deployment template is further configured to add the application deployment information to deployment artifacts (artifacts) of deployment nodes in the TOSCA template. For the specific implementations of the foregoing units, refer to the introductions and descriptions of the foregoing examples of procedures, and details are not described herein again. Specific functions of the foregoing units may be stored in computer code in a form of software, and are performed by a processor invoking corresponding code.

An embodiment of the present invention further provides a server that supports cross-platform application deployment, including:

a receiving unit, configured to: receive an application deployment request, and determine, based on the application deployment request, a deployment template required for application deployment, where the deployment template conforms to a TOSCA template format, the deployment template further includes information about a target platform for deployment and application deployment information required for application deployment on the target platform for deployment, and the target platform is a platform of a type other than a TOSCA platform;

a sending unit, configured to send the application deployment information to the target platform based on the information about the target platform in the deployment template; and an obtaining unit, configured to: obtain values of configuration parameters required for application deployment on the target platform, and send the values of the configuration parameters to the target platform by using the sending unit.

With reference to introductions in the examples of the deployment template and descriptions of the procedure of application deployment, a person skilled in the art can clearly understand the processing of implementation details of the foregoing units in specific application deployment, and details are not described herein again. Specific functions of the foregoing units may also be stored in computer code in a form of software, and performed by a processor invoking corresponding code.

What is claimed is:

1. A method, comprising:
   receiving, by a server, an application deployment request from a requesting client, the server comprising a processor and configured to communicate with a first controller of a Topology and Orchestration Specific for Cloud Applications (TOSCA) platform and a second controller of a non-TOSCA platform;
   determining, by the server based on a deployment template identifier in the application deployment request, an application deployment template required for application deployment on the non-TOSCA platform, wherein the application deployment template conforms to a TOSCA template format and comprises information about the non-TOSCA platform and application deployment information for application deployment on the non-TOSCA platform;
   sending, by the server, the application deployment information to the second controller of the non-TOSCA platform based on the information about the non-TOSCA platform in the application deployment template;
   obtaining, by the server, values of configuration parameters required for the application deployment on the non-TOSCA platform, and
   sending, by the server, the values of the configuration parameters to the second controller of the non-TOSCA platform.

2. The method according to claim 1, wherein the non-TOSCA platform is an open virtualization format (OVF) platform.

3. The method according to claim 1, wherein the information about the non-TOSCA platform is added to parameters "inputs" of a TOSCA template.

4. The method according to claim 2, wherein the application deployment information is an OVF deployment package or an address of the OVF deployment package.

5. The method according to claim 4, wherein the application deployment information is added to deployment artifacts of deployment nodes in a TOSCA template.

6. The method according to claim 5, wherein the application deployment information is placed in the deployment artifacts in a form of a file address, and the file address is an address for storing the OVF deployment package.

7. The method according to claim 1, wherein the application deployment template further comprises a transfer indication, and the transfer indication is used to indicate sending of the application deployment information to the non-TOSCA platform.

8. The method according to claim 1, wherein the obtaining values of configuration parameters required for the application deployment on the non-TOSCA platform comprises:
   obtaining the values of the parameters required for application deployment from the requesting client according to parameter information that is required for application deployment and that is received from the non-TOSCA platform.

9. The method according to claim 1, further comprising:
   receiving, by the server from the requesting client, a TOSCA template comprising the deployment template identifier, the information about the non-TOSCA platform and the application deployment information for application deployment on the non-TOSCA platform.

10. The method according to claim 9, wherein the step of determining, by the server based on the application deployment request, the application deployment template comprises:
    receiving, by the server from the requesting client, the TOSCA template;
    determining, by the server, the application deployment template based on the deployment template identifier in the application deployment request and the TOSCA template.

11. A server comprising:
    a computer readable memory storing computer program instructions; and
    a processor in communication with the computer readable memory, wherein the processor executes the computer program instructions to:
    receive an application deployment request from a requesting client, the application deployment request comprising a deployment template identifier;
    determine, based on the deployment template identifier in the application deployment request, an application deployment template for an application deployment on a non Topology and Orchestration Specific for Cloud Applications (non-TOSCA) platform different from a TOSCA platform, wherein the application deployment template conforms to a TOSCA template format and comprises information about the non-TOSCA platform and application deployment information for the application deployment on the non-TOSCA platform;
    send the application deployment information for the application deployment on the non-TOSCA platform to a controller of the non-TOSCA platform based on the information about the non-TOSCA platform in the application deployment template;

obtain values of configuration parameters required for the application deployment on the non-TOSCA platform, and send the values of the configuration parameters to the controller of the non-TOSCA platform.

12. The server according to claim 11, wherein the information about the non-TOSCA platform is added to parameters "inputs" of the TOSCA template.

13. The server according to claim 11, wherein the application deployment information is an open virtualization format (OVF) deployment package or an address of an OVF deployment package.

14. The server according to claim 13, wherein the application deployment information is placed in deployment artifacts in a form of the address for storing the OVF deployment package.

15. The server according to claim 11, wherein the processor executes the computer program instructions to:
receive parameter information for application deployment from the non-TOSCA platform; and
obtain the values of the parameters required for application deployment from the requesting client according to the parameter information for application deployment and the application deployment template.

16. The server according to claim 11, wherein the processor executes the computer program instructions to:
receive, from the requesting client, a TOSCA template that comprises the deployment template identifier, the information about the non-TOSCA platform and the application deployment information for application deployment on the non-TOSCA platform.

17. The server according to claim 11, wherein the non-TOSCA platform is an open virtualization format (OVF) platform.

18. A system, comprising:
a Topology and Orchestration Specific for Cloud Applications (TOSCA) platform comprising a first controller and a first virtual resource management platform;
a non-TOSCA platform comprising a second controller and a second virtual resource management platform;
a server, in communications with the first controller of the TOSCA platform and the second controller of the non-TOSCA platform, comprising a processor configured to:

receive an application deployment request from a requesting client, the application deployment request comprising a deployment template identifier;
determine, based on the deployment template identifier in the application deployment request, an application deployment template required for application deployment on the non-TOSCA platform, wherein the application deployment template conforms to a TOSCA template format and comprises information about the non-TOSCA platform and application deployment information for application deployment on the non-TOSCA platform;
send the application deployment information to the second controller of the non-TOSCA platform based on the information about the non-TOSCA platform in the application deployment template;
obtain values of configuration parameters required for the application deployment on the non-TOSCA platform, and
send the values of the configuration parameters to the second controller of the non-TOSCA platform.

19. The system according to claim 18, wherein the processor of the server is further configured to:
receive parameter information for application deployment from the non-TOSCA platform; and
obtain the values of the parameters required for application deployment from the requesting client according to the parameter information for application deployment and the application deployment template.

20. The system according to claim 18, wherein the processor of the server is further configured to:
receive a TOSCA template from the requesting client, the TOSCA template comprising the deployment template identifier, the information about the non-TOSCA platform and the application deployment information for application deployment on the non-TOSCA platform; and
determine the application deployment template based on the deployment template identifier in the application deployment request and the TOSCA template.

* * * * *